(12) United States Patent
Armbruster et al.

(10) Patent No.: US 7,762,610 B2
(45) Date of Patent: Jul. 27, 2010

(54) CONVERTIBLE TOP

(75) Inventors: Reiner Armbruster, Mühlacker (DE); Joachim Knirsch, Hüttlingen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 0 days.

(21) Appl. No.: 11/943,712

(22) Filed: Nov. 21, 2007

(65) Prior Publication Data
US 2008/0122247 A1    May 29, 2008

(30) Foreign Application Priority Data
Nov. 23, 2006    (DE) .................. 10 2006 055 189

(51) Int. Cl.
*B60J 7/00*    (2006.01)
(52) U.S. Cl. ................... 296/107.09; 296/107.08
(58) Field of Classification Search ........... 296/107.09, 296/117, 107.01, 147, 107.15, 115, 136.05, 296/107.07; 280/648
See application file for complete search history.

(56) References Cited

U.S. PATENT DOCUMENTS

| | | | |
|---|---|---|---|
| 2,785,003 A * | 3/1957 | Zaravsey ................ | 296/107.05 |
| 3,251,625 A * | 5/1966 | Adamski .................... | 296/117 |
| 3,976,324 A | 8/1976 | Lehmann | |
| 5,002,330 A | 3/1991 | Koppenstein et al. | |
| 5,267,771 A | 12/1993 | Rothe | |
| 6,231,110 B1 * | 5/2001 | Umeda et al. ......... | 296/146.14 |
| 6,416,111 B1 * | 7/2002 | Neubrand .............. | 296/107.09 |
| 6,439,642 B2 * | 8/2002 | Mac Farland ......... | 296/107.15 |
| 6,547,312 B2 * | 4/2003 | Winkler ................ | 296/100.14 |
| 6,695,385 B1 * | 2/2004 | Lange ................... | 296/107.09 |
| 7,118,161 B2 * | 10/2006 | Neubrand .............. | 296/107.15 |
| 7,198,317 B2 * | 4/2007 | Reck ..................... | 296/107.07 |
| 7,347,482 B2 * | 3/2008 | Powell .................. | 296/107.08 |
| 7,559,595 B2 * | 7/2009 | Bunsmann et al. ..... | 296/107.08 |
| 2003/0127883 A1 * | 7/2003 | Antreich ............... | 296/107.01 |
| 2003/0152660 A1 | 8/2003 | Schutt | |

FOREIGN PATENT DOCUMENTS

| | | |
|---|---|---|
| DE | 2327485 B1 | 9/1974 |
| DE | 3726430 C1 | 9/1988 |
| DE | 3834490 A1 | 4/1990 |
| DE | 3907227 C1 | 5/1990 |
| DE | 9102150.2 U1 | 5/1991 |
| DE | 4123283 A1 | 1/1993 |
| DE | 4438253 C1 | 10/1995 |
| DE | 29707036 U1 | 2/1998 |
| DE | 19903411 C1 | 10/2000 |
| DE | 10164500 B4 | 1/2005 |
| DE | 102004011856 A1 | 9/2005 |
| FR | 2809350 A1 | 11/2001 |

OTHER PUBLICATIONS

European Search Report dated Feb. 18, 2009.

* cited by examiner

*Primary Examiner*—Kiran B. Patel

(57) ABSTRACT

A convertible top can be displaced between a closed position and a put-away position. The convertible top contains a flexible convertible top cloth, rear side regions of which each have at least one folding device acting on them, impressing at least one defined fold in each case on the convertible top cloth during the transfer from the closed position into the put-away position. Each folding device has at least one linear, rod-shaped folding mechanism which, during the transfer of the convertible top into the put-away position, prevents a folding of the convertible top cloth transversely with respect to its longitudinal direction.

7 Claims, 3 Drawing Sheets

CONVERTIBLE TOP

CROSS-REFERENCE TO RELATED APPLICATION

This application claims the priority, under 35 U.S.C. §119, of German application DE 10 2006 055 189.3, filed Nov. 23, 2006; the prior application is herewith incorporated by reference in its entirety.

BACKGROUND OF THE INVENTION

Field of the Invention

The present invention relates to a convertible top which can be displaced between a closed position and a put-away position. The convertible top contains a flexible convertible top cloth. Rear side regions of which each have at least one folding device acting on them, impressing at least one defined fold in each case on the convertible top cloth during the transfer from the closed position into the put-away position. In addition, the invention relates to a convertible equipped with a convertible top of this type.

German patent DE 199 03 411 C1 discloses a convertible top which can be displaced between a closed position and a put-away position and has a convertible top linkage which contains a plurality of linkage parts. Furthermore, the convertible top has a convertible top cloth material which is supported by the convertible top linkage, the convertible top cloth material being folded in the put-away position. In order to ensure that the convertible top cloth material folds in a defined manner, a folding mechanism is provided, the folding mechanism acting on the convertible top cloth material and impresses at least one defined fold on the convertible top cloth material during the transfer from the closed position into the put-away position.

German patent DE 37 26 430 C1 discloses a folding convertible top with a convertible top linkage which supports a cloth. In the region of the side edges of the visible opening of the rear window, a tension spring element, which contains a rubber band, is respectively fixed under prestress on the inside of the cloth. Since the tension spring elements contract as the rear region of the folding convertible top is pivoted upward, a defined creasing which extends over the entire width of the rear window is automatically formed.

Further convertible tops with enforced creasing are known, for example, from German Utility Model DE 297 07 036 U1 and from German patent DE 39 07 227 C1, corresponding to U.S. Pat. No. 5,002,330.

BRIEF SUMMARY OF THE INVENTION

It is accordingly an object of the invention to provide a convertible top that overcomes the above-mentioned disadvantages of the prior art devices of this general type, which is distinguished in particular by the convertible top always being folded in an identical manner, since this is enforced, in its put-away state.

With the foregoing and other objects in view there is provided, in accordance with the invention, a convertible top being displaced between a closed position and a put-away position. The convertible top contains a flexible convertible top cloth having rear side regions and a longitudinal direction; and folding devices. At least one of the folding devices acts on each of the rear side regions and impresses at least one defined fold in each case on the flexible convertible top cloth during a transfer from the closed position into the put-away position. Each of the folding devices has at least one linear, rod-shaped folding mechanism which, during a transfer of the convertible top into the put-away position, prevents a folding of the flexible convertible top cloth transversely with respect to the longitudinal direction.

The present invention is based on the general concept of providing at least one linear, rod-shaped folding mechanism in each case on a rear side region of the convertible top. The folding mechanism prevents the convertible top cloth from gathering in the region of the rod-shaped folding mechanism during opening of the convertible top and thereby enforcing folding at a different location. During each opening operation of the convertible top, the folding enforced in this manner is always identically repeated, and therefore the convertible top according to the invention is always put away identically during opening. The at least one linear, rod-shaped folding mechanism is part of a folding device disposed in each case on the side region of the convertible top cloth and is disposed with its one longitudinal end on the convertible top cloth and with its other longitudinal end, for example, in a convertible top linkage such that folding or shortening of the convertible top cloth is always prevented in the longitudinal direction of the rod-shaped folding mechanism.

The folding mechanisms are expediently formed from plastic, from fiber glass or from metal, in particular from spring sheet. All of these materials permit virtually freely selectable shaping and also material properties which can in each case be determined precisely beforehand. In addition, folding mechanisms in particular made of plastic can be produced very cost-effectively, which has a positive effect on the manufacturing costs of the convertible top and of a convertible equipped with the convertible top according to the invention. It is also conceivable, in particular in the manufacturing of sports cars, for high-quality materials, such as, for example, carbon fibers, to be used which, first, have a very high strength or rigidity and, second, have a low dead weight.

In an advantageous development of the solution according to the invention, each folding device has linear folding mechanisms which are disposed at an inclination with respect to each other, in particular in a V-shaped manner with respect to each other. This configuration has a particularly favorable effect on the desired folding of the convertible top cloth, with it being possible for a longitudinal direction of the folding mechanisms to be directed toward a pivoting point of the convertible top on the vehicle body. In order to provide a particularly flat and space-saving embodiment of the folding mechanism, for example in the form of a spring sheet, with sufficient longitudinal rigidity, the folding mechanism can be guided, for example, through a longitudinal strap which is present and which prevents the folding mechanism from bulging in its transverse direction during putting away of the convertible top. If there are two folding mechanisms, they are guided through the longitudinal strap at two spaced-apart points.

In a further advantageous embodiment of the solution according to the invention, the folding mechanisms engage at least at one of their longitudinal ends in a pocket disposed on the inside of the convertible top cloth, and are held on the convertible top cloth in the pocket. Such a pocket can be, for example, ironed or stuck onto the convertible top cloth and constitutes a simple and reliable measure of securing the rod-shaped folding mechanism on the convertible top cloth. The pocket receiving the rod-shaped folding mechanism is preferably not visible from the outside and inside, since the convertible top cloth is lined from the inside with an inside head lining, and the pocket is therefore concealed between an inside of the convertible top cloth and a side of the inside head lining that faces the convertible top cloth. This affords the great advantage that the folding device is not visually perceptible and, as a result, an external appearance of the convertible top and of the convertible is not impaired.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a convertible top, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
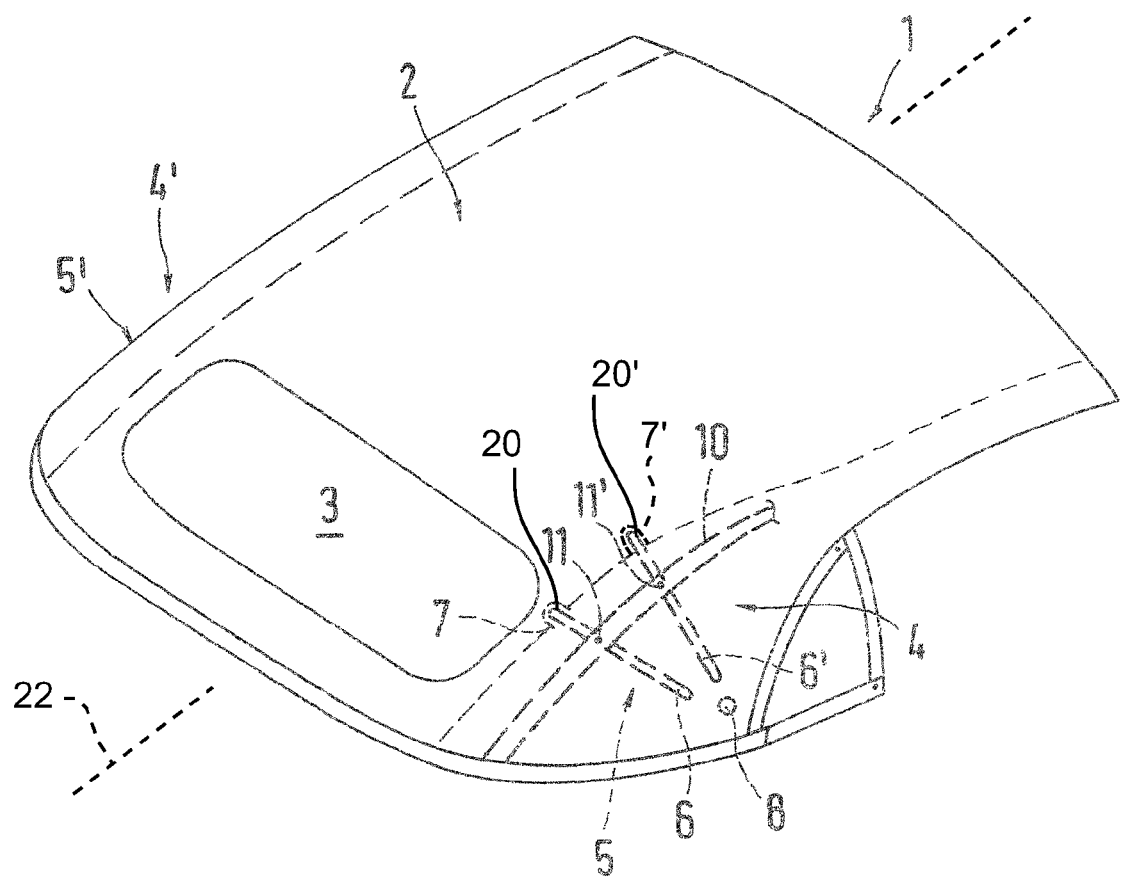
FIG. 1 is a diagrammatic, perspective view of a closed convertible top according to the invention, with a folding device being illustrated at least schematically.
Figure 2:
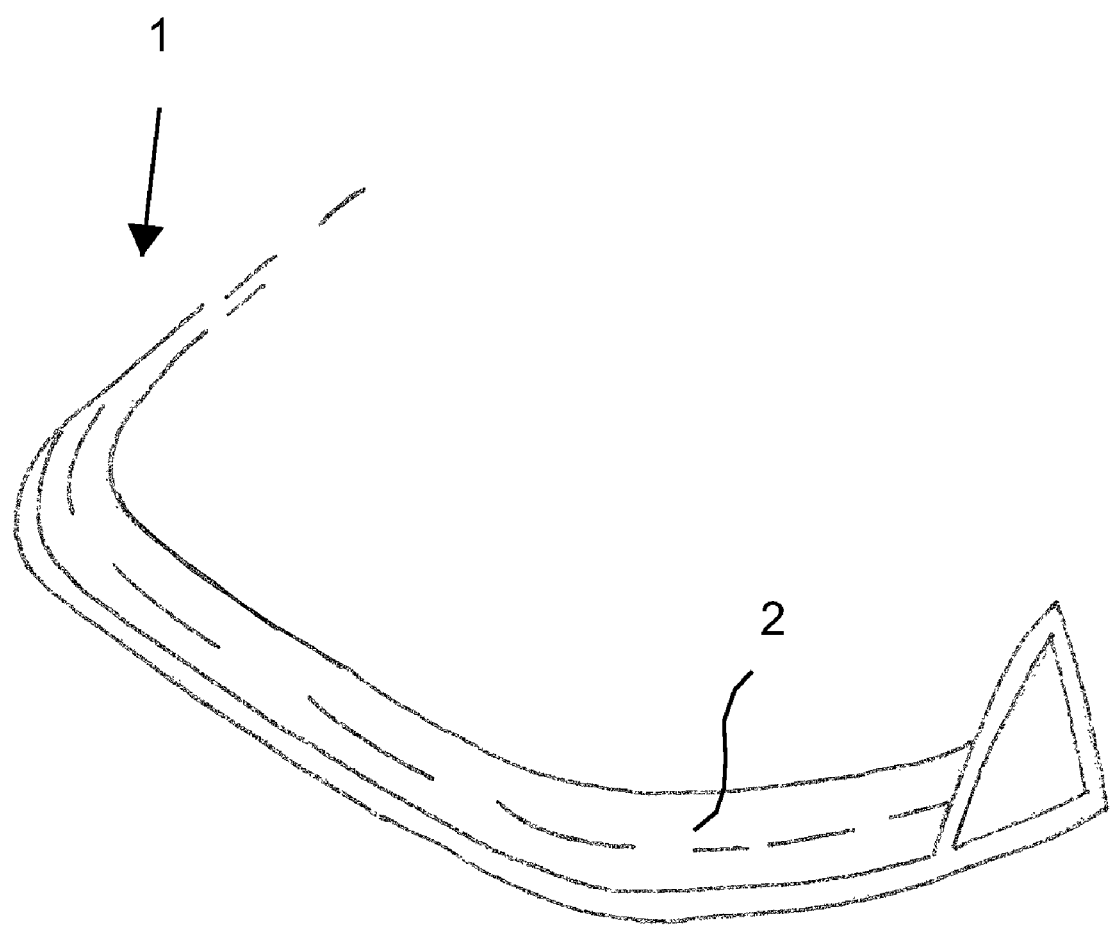
FIG. 2 is a diagrammatic, perspective view of the convertible top in the put away position.

Referring now to FIG. 1 of the drawing in detail, there is shown a convertible top 1, according to the invention, that has a flexible convertible top cloth 2, usually a water-repelling textile cloth. The convertible top 1 can be displaced in a known manner between a closed position, as illustrated in FIG. 1, and a put-away position, as illustrated in FIG. 2, in which a passenger compartment of a convertible equipped with the convertible top 1 is open. Furthermore, a rigid or flexible rear window 3 which enables the driver of the convertible to see to the rear can be disposed at a rear end region of the convertible top 1.

Figure 3:
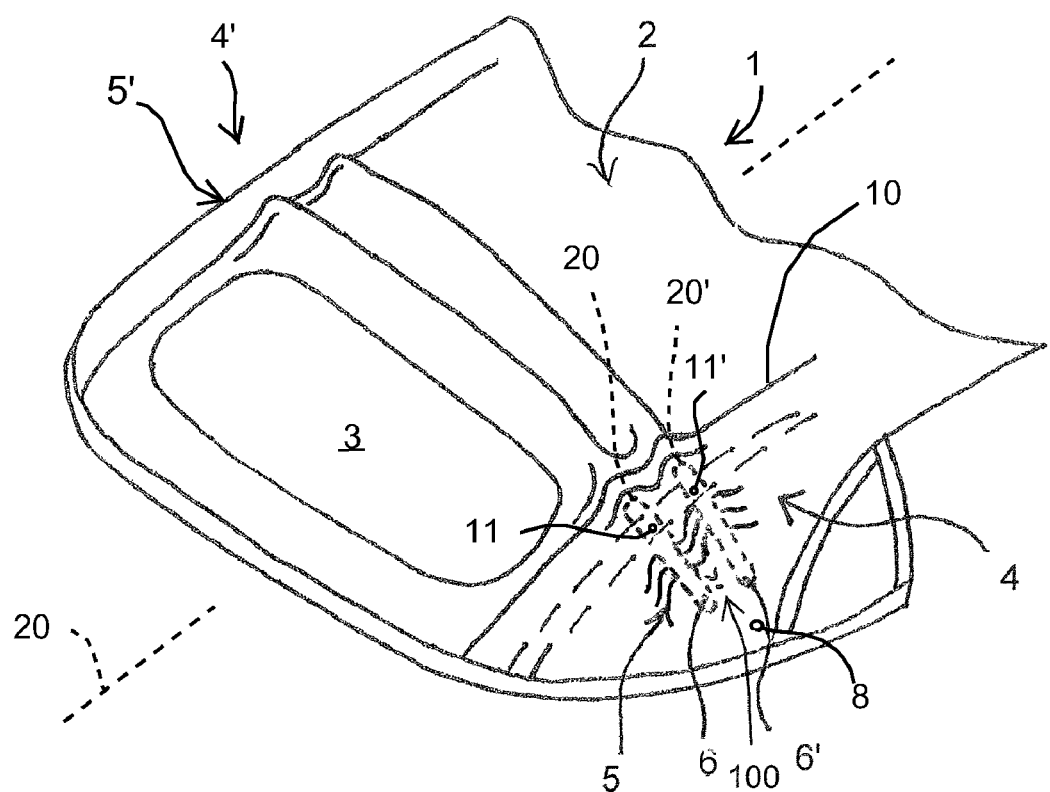
FIG. 3 is a diagrammatic, perspective view of a convertible top in the process of being folded up.

In order, in the put-away position of the convertible top 1 or when opening the same, to be able, as far as possible, always to achieve identical folding of the convertible top cover 2, at least one folding device 5, 5' acts in each case on a rear side region 4, 4' of the convertible top cloth 2 and impresses at least one defined fold 100 in each case on the convertible top cloth 2 during the transfer from the closed position into the put-away position, as is shown in FIG. 3.

According to the invention, each folding device 5, 5' has at least one rod or linear, rod-shaped folding mechanism 6, 6' which, during the opening of the convertible top 1 and the subsequent transfer into its put-away position, prevents a folding 9 of the convertible top cloth 2 transversely with respect to the longitudinal direction 22 of the folding mechanism 6. In the exemplary embodiment shown in the drawing, each folding device 5 has in each case two rods or folding mechanisms 6, 6' which, furthermore, run at an inclination with respect to each other, in particular are disposed in a V-shaped manner with respect to each other.

The linear folding mechanisms 6, 6' are preferably configured as flexurally soft rods. Examples of suitable materials for a folding mechanism 6, 6' of this type are plastic, fiber glass or metal, with, in particular in the case of folding mechanisms 6, 6' manufactured from metal, "spring sheets" or metals with a shape memory being used.

If required, the folding mechanisms 6, 6' can have a predefined shape in order to ensure a tension-free state in the closed convertible top 1 and to prevent marking on the convertible top cloth 2. In order to tension the convertible top cloth 2, the folding mechanisms 6, 6' are connected at least at one of their longitudinal ends 20, 20' to the convertible top cloth 2 while they are connected at their other longitudinal end, for example, likewise to the convertible top cloth 2, to a convertible top linkage (not denoted specifically) or to the convertible body. A connection which is preferably used between the folding mechanism 6, 6' and the convertible top cloth 2 contains, for example, a pocket 7, 7' (merely indicated) which is disposed on the inside of the convertible top cloth 2 and in which the folding mechanism 6, 6' engages by one of its longitudinal ends 20, 20'. A pocket 7 of this type can be adhesively bonded or sewn, for example, to the convertible top cloth 2. An adhesive bond can be achieved in particular by such a pocket 7 being ironed on. Of course, it is also conceivable for at least one of the folding mechanisms 6, 6' to engage with both longitudinal ends in pockets 7 which are disposed on the convertible top cloth 2 and lie opposite each other, and thereby to prevent folding or shortening of the convertible top cloth 2 in the longitudinal direction of the folding mechanism 6, 6'.

As an alternative to this, at least one of the folding mechanisms 6, 6' can be fastened at its longitudinal end which does not engage in a pocket 7 to the convertible top linkage or to the convertible body and can thereby likewise permit tensioning of the convertible top cloth 2. Pockets 7 of this type have the great advantage that installation of the linear, rod-shaped folding mechanism 6, 6' according to the invention on the convertible top cloth 2 is possible in a very simple manner, since the folding mechanism 6, 6' merely has to be inserted into the pocket 7. The pocket 7 is disposed on an inside of the convertible top cover 2 and is therefore covered by a head lining covering the inside of the convertible top cloth 2. Accordingly, neither the pocket 7 nor the folding mechanisms 6, 6' are visible in the finished convertible top 1, and therefore an aesthetic overall impression of the convertible top 1 is not impaired either from the inside or from the outside.

In order to provide a very flat and space-saving variant of the folding mechanism 6, 6', for example in the form of a spring sheet, with sufficient longitudinal rigidity, the folding mechanism can be guided, for example, through a longitudinal strap 10 which is present and which prevents the folding mechanism 6, 6' from bulging in its transverse direction during putting away of the top. If there are two folding mechanisms 6, 6', they are guided through the longitudinal strap 10 at two spaced-apart points 11, 11'.

As can furthermore be gathered from the drawing, the folding mechanisms 6, 6' are usually disposed on the convertible top 1 in the region of a C pillar of the convertible, with, of course, each of the side regions 4, 4' being assigned a folding device 5, 5' with at least one folding mechanism 6, 6' in each case. The individual folding mechanisms 6, 6' may be oriented in a V-shaped manner with respect to each other, as shown in the drawing, but other alignments and positions which have the effect of impressing at least one defined fold in each case on the convertible top cloth 2 during the transfer from the closed position into the put-away position are also conceivable.

In addition to the linear, rod-shaped folding mechanism 6, 6', according to the drawing a folding mechanism 8 is provided which acts in a punctiform manner on the convertible top cloth 2 and is connected, for example via a non-illustrated spring element, to the convertible top linkage or to the convertible body. The folding mechanism 8 which acts in a punctiform manner on the convertible top cloth 2 can be disposed in particular in the region of an imaginary intersecting point of the extended, linear folding mechanisms 6, 6', with, of course, a different arrangement also being conceivable if it ensures reliable and always identical folding of the convertible top cloth 2 during opening of the convertible top 1.

The invention claimed is:

1. A convertible top being displaced between a closed position and a put-away position, the convertible top comprising:
   a flexible convertible top cloth having rear side regions and a longitudinal direction; and
   folding devices disposed at said rear side regions of said convertible top cloth, each one of said folding devices including at least one rod and a longitudinally extending strap including a point at which said at least one rod is guided;
   said at least one rod acting on one of said rear side regions and impressing at least one defined fold on said flexible convertible top cloth during a transfer from the closed position into the put-away position.

2. The convertible top according to claim 1, further comprising a folding mechanism acting on said convertible top cloth in a punctiform manner.

3. The convertible top according to claim 1, wherein said at least one rod is flexible.

4. The convertible top according to claim 1, further comprising a further rod, said at least one rod and said further rod disposed in a V-shaped manner with respect to each other.

5. The convertible top according to claim 1, wherein:
   said flexible convertible top cloth has a pocket; and
   said at least one rod includes a longitudinal end engaging and held by said pocket.

6. The convertible top according to claim 1, wherein said at least one rod is formed from a material selected from the group consisting of plastic, fiber glass, metal, and spring sheet.

7. The convertible top according to claim 1, further comprising a further rod, said at least one rod and said further rod running at an inclination with respect to each other.

* * * * *